(No Model.) 2 Sheets—Sheet 1.
A. L. THOMPSON.
TIGHTENER AND FASTENER FOR FENCE WIRES.
No. 395,525. Patented Jan. 1, 1889.
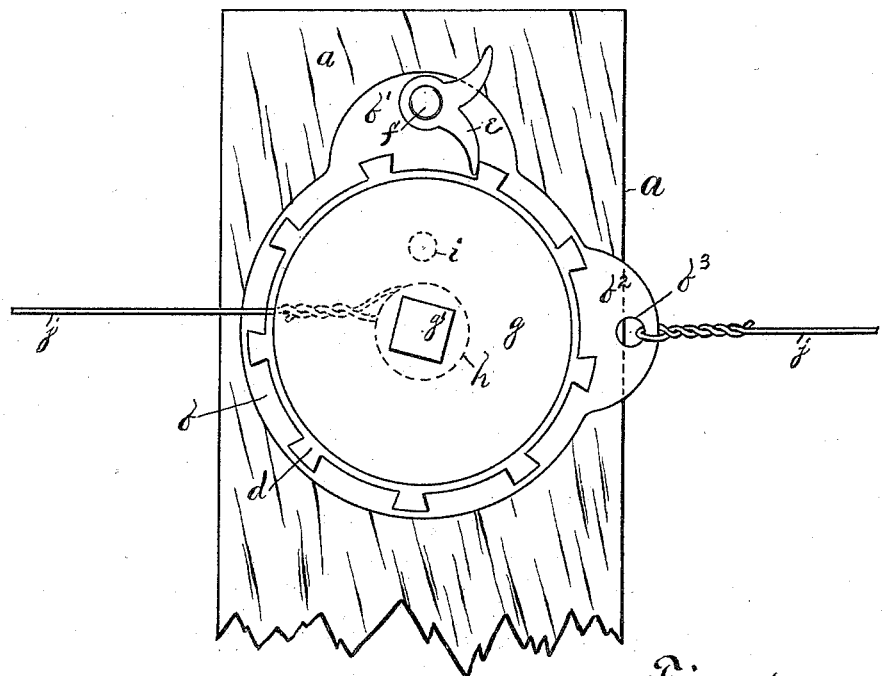
Fig. 1.
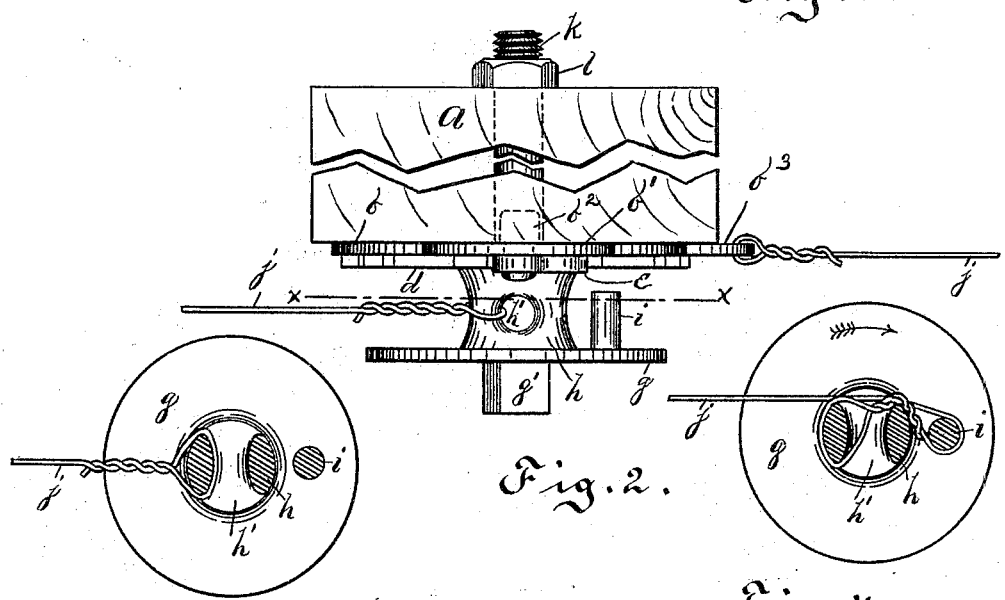
Fig. 2.
Fig. 3. Fig. 4.
Witnesses: Inventor,
Otto Hoddick. Adelbert L. Thompson
Jacob Degen.

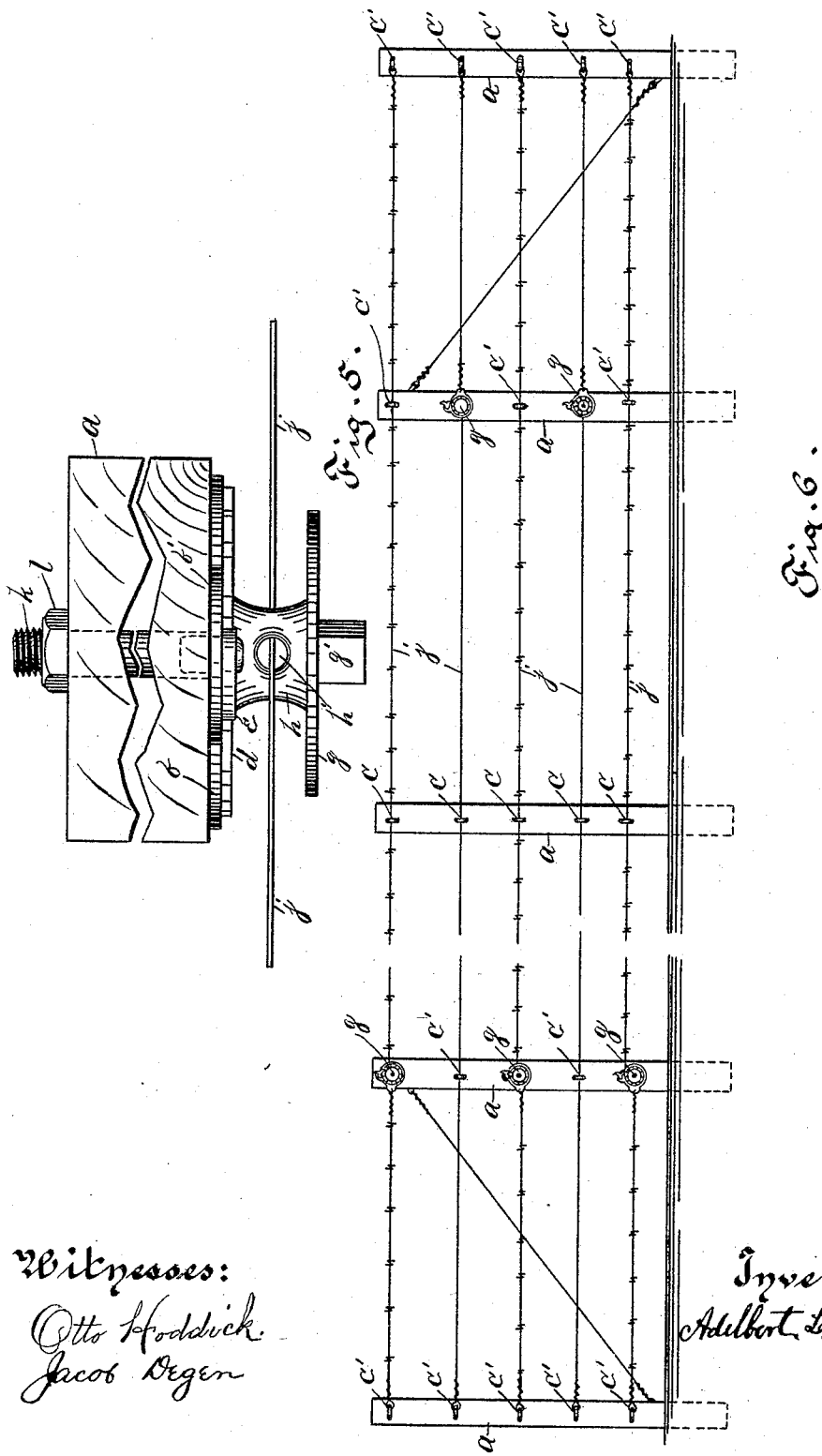

UNITED STATES PATENT OFFICE.

ADELBERT L. THOMPSON, OF EAST AVON, NEW YORK.

TIGHTENER AND FASTENER FOR FENCE-WIRES.

SPECIFICATION forming part of Letters Patent No. 395,525, dated January 1, 1889.

Application filed September 20, 1888. Serial No. 285,897. (No model.)

*To all whom it may concern:*

Be it known that I, ADELBERT L. THOMPSON, a citizen of the United States, residing at East Avon, in the county of Livingston and State of New York, have invented certain new and useful Improvements in Tighteners and Fasteners for Fence-Wires, and for other like purposes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates more particularly to an apparatus for tightening wires when used for making fences, or when used for making trellises in vineyards, or for other like purposes.

It is a well-known fact that wire fences, trellises, &c., are more or less subject to expansion and contraction by the elements, which invariably results in leaving the fence in a loose and hanging condition, and that the weight of fruit upon the grape-vines frequently causes the wires of trellises to sag and loosen, so as to huddle and crowd the fruit, to its great detriment.

The object of my invention is to obviate these difficulties, for by the use of my invention the wires on a fence or trellis can be loosened in the fall and tightened again in the spring by a few moments' labor, thus avoiding all breaking of wires and all loosening of posts by the contraction and expansion of the wires, and the wires on trellises can be tightened while loaded with vines and fruit without injury to either.

This invention is an improvement upon the "tightener and fastener" patented by me under patent dated April 17, A. D. 1888, and numbered 381,295.

I will now proceed to describe my invention, reference being had to the annexed drawings.

Like letters represent like parts in all the figures.

Figure 1 is a front face view of my improved tightener. Fig. 2 is a top plan view of the same. Fig. 3 is a reduced section taken on the line $x$ $x$ of Fig. 2, showing the front plate of the tightener. Fig. 4 is a similar view showing the tightener turned, drawing the wire to its proper tension. Fig. 5 illustrates my improved tightener when used in the middle of a fence, showing the wire passing through it. Fig. 6 shows a wire fence to which my improved tightener is applied.

$a$ represents a fence-post to which my improved tightener is fastened. (See Figs. 1, 2, 5, and 6.) $b$ is the washer; $b'$, the top extension of the washer for carrying the pawl; $b^2$, a side extension of the washer; $b^3$, an orifice in said extension of washer in which to fasten the end of a wire. $c$ shows loose staples; $c'$, tight staples. $d$ is the sprocket or ratchet wheel of the tightener; $e$, the pawl; $f$, a pin passing through the pawl; $g$, the front plate; $g'$, an extension of the hub or shaft $h$ for receiving a key or wrench; $h$, the center hub or shaft; $h'$, a transverse orifice in the center hub; $i$, a pin or stud; $j$, the wire; $k$, a bolt, and $l$ a nut.

This improvement over my invention covered by Patent No. 381,295, dated April 17, 1888, consists in using a double pawl, $e$, (so that the tightener can be worked from either direction,) instead of a single pawl, as in said patent; also, in forming a side extension or projection, $b^2$, (on one or both sides of the washer $b$,) in which the hole or orifice $b^3$ is placed. The orifice $b^3$ is for the purpose of holding a wire running from the tightener to the end post to relieve the bolt $k$ from the strain. The tighteners are placed upon the second post from the end of the fence for that purpose.

It also consists in making the transverse hole or orifice through the center hub or shaft, $h$. This hole or orifice through the hub or center shaft is for the purpose of fastening the wire through it, as represented in Fig. 2, when the tightener is placed near the end of the fence or trellis. The stud or pin $i$ is retained, so that when it is desired to use the tightener in the center of a fence or trellis the wire can be placed under this pin, and thus tightened from both directions by turning the hub with the key or wrench, as set forth in the aforementioned patent. The sprocket or ratchet wheel $d$ has also been changed so that it will engage the pawl from either direction.

The head of the bolt $k$ is cast solidly into the back of the center hub, $h$, and made integral with it. Figs. 2 and 5 represent the head of said bolt so fastened. There is also a hollow pin or stud, $b^4$, cast on the back of the washer $b$ and integral with it, through which the pin $f$, that holds the pawl $e$ in place, passes and is riveted. This pin is about half an inch in diameter and about the same in length, and fits into a hole made in the post for that purpose, its use being to keep the washer from turning when the pawl $e$ engages the ratchet $d$. It is shown in Figs. 2 and 5.

The operation of my invention is as follows: In Fig. 6 I have shown a five-wire fence having a tightener for each wire secured to the second post from the end. A wire is then securely twisted and fastened into the orifice of the side extension or projection, $b^2$, and the other end drawn taut and securely fastened to the end post, $a$. The fence-wire to be tightened is then twisted and securely fastened into the hole or orifice $h'$ in the center hub or hollow shaft, $h$. The pawl $e$ is then placed so that it will engage the sprocket or ratchet wheel $d$ on whichever side it is desired. The wire is then run along the posts through loose staples $c$ and securely fastened to the post at the other end of the fence. Then on turning the center hub or hollow shaft, $h$, with the key or wrench the wire is drawn to the desired tension, and is held firmly by the pawl $e$ engaging the sprocket or ratchet wheel $d$.

What I claim as my invention and improvement, and for which I desire to secure Letters Patent, is—

A wire-tightener consisting of a double ratchet-plate, $d$, a central hub, $h$, provided with a transverse orifice, $h'$, a front plate, $g$, a projecting square end, $g'$, and a bolt, $k$, all integral with each other, in combination with washer $b$, having projections $b'$ and $b^2$, (projection $b^2$ being provided with a perforation, $b^3$,) and with double pawl $e$, carried by projection $b'$, all substantially as shown.

In testimony whereof I have signed my name to this specification in the presence of two subscribing witnesses.

ADELBERT L. THOMPSON.

Witnesses:
ROBERT GIRVEN,
JACOB DEGAN.